March 22, 1955 M. CHRIST 2,704,606
COMBINATION KITCHEN UTENSIL
Filed Feb. 24, 1953
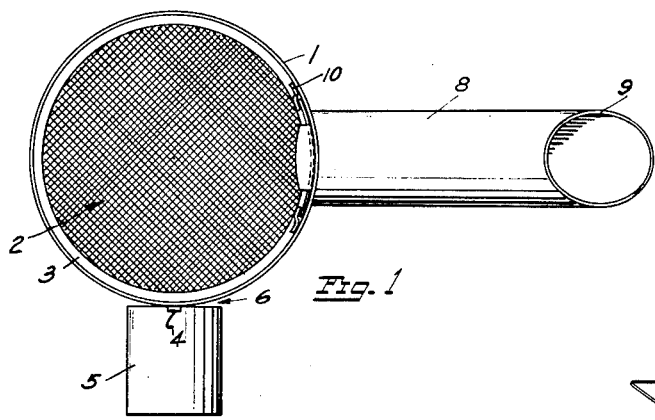
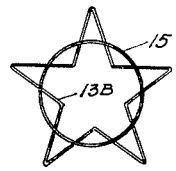
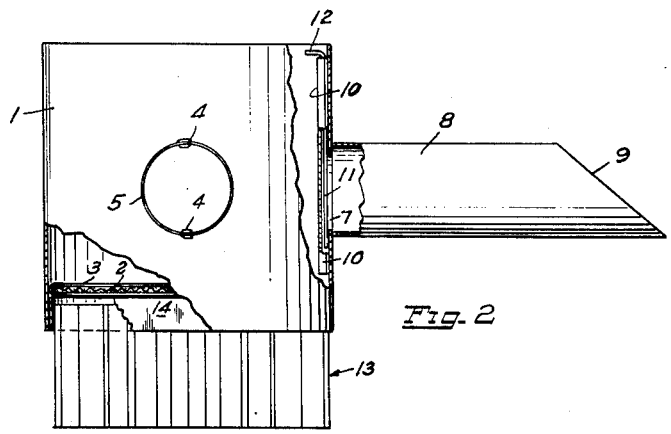
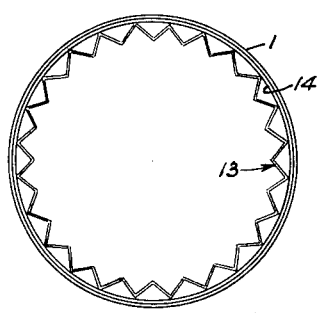
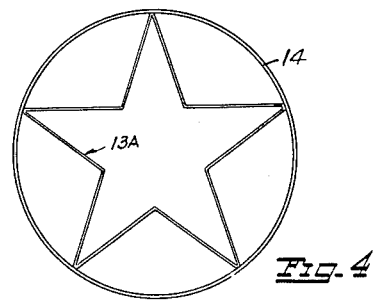
MUREEN CHRIST
INVENTOR.

2,704,606

COMBINATION KITCHEN UTENSIL

Mureen Christ, Dilly, Oreg.

Application February 24, 1953, Serial No. 338,439

1 Claim. (Cl. 209—352)

This invention relates to improvements in culinary devices.

The principal object of the invention is to combine into a single unit, a flour sifter, a doughnut cutter, biscuit cutter, cookie cutters and a hollow tubular element designed for filling sausage and coring fruit.

Another object is to provide a device of this character which is of simple and inexpensive construction, efficient in its operation and wherein its several parts are readily accessible for cleaning purposes.

These and other objects will appear as my invention is more fully hereinafter described in the following specification, illustrated in the accompanying drawing and finally pointed out in the appended claim.

In the drawing:

Figure 1 is a top plan view of the invention.

Figure 2 is a side elevation of Figure 1 with fragments broken away.

Figure 3 is a bottom plan view of a cookie cutter.

Figures 4 and 5 are top plan views of modified forms of cookie cutters.

Referring now more particularly to the drawing:

In Figures 1 and 2 reference numeral 1 indicates a hollow receptacle whose open end may be used as a doughnut or biscuit cutter. To the interior of the receptacle near its bottom end I secure a circular screen 2 of wire mesh by means of a ring 3 which is soldered to the walls of the receptacle so that the device may be used either as a flour sifter or as a strainer for other substances. Secured to the exterior of the receptacle by soldering at two diametrically opposed points indicated at 4, is an open-ended cylinder 5 whose outer edge is adapted to cut holes in doughnuts. The inner end of the cylinder is tangential to the wall of the receptacle to allow air to escape from within the cylinder during a cutting operation which would otherwise tend to hold the cut material within the cylinder. To the exterior of the receptacle 1 at right angles to the cylinder 5 and surrounding an opening 7 formed in the receptacle I secure an open-ended dispensing tube and fruit coring tool 8 tapered as at 9 at its outer end and which also serves as a handle when the device is used for other purposes.

To the interior of the receptacle 1 I secure a pair of vertically disposed opposing parallel tracks 10 arranged on opposite sides of the opening 7. Slidably mounted for vertical movement within the tracks is a closure plate 11 whose upper end is turned at right angles as at 12 to form a finger grip and also to serve as a limit stop for the downward movement of the closure plate to a position where it seals off the opening 7 in the wall of the receptacle when the receptacle is being used as a flour sifter or a strainer.

When the tool 8 is being used for filling sausages, with the contents of the receptacle, the closure plate is drawn upwardly into an open position or it may be entirely removed from the tracks 10 if desired. The sausage skin is drawn over the handle and gathered up against the wall of the receptacle, then as the sausage-filling material is forced out of the receptacle through the tool and into the sausage the skin is gradually pulled away from the handle as the filling operation progresses. When a desired length of filled sausage skin has been forced outwardly from the end of the tubular element 8, the length of each sausage may be fixed by the operator pinching downwardly on the skin with his thumb against the tapered end of the tube. This will cut off the supply of sausage filler and firmly pack the now filled length of sausage. Then, by twisting the sausage about the bottom end of the taper 9 a connecting link will be formed between the sausages.

The tool 8 may also be used for coring apples, pears and the like and when so used the closure plate 11 is elevated into an open position or entirely removed from the tracks 10 so that the cores of the fruit may be collected within the receptacle 1.

For supporting the receptacle 1 to elevate the tubular member 8 into a more accessible position with respect to a work table or other support when the device is being used for filling sausage or as a fruit coring tool, I provide a removable base, generally indicated at 13 in Figures 2 and 3, which may be generally circular in form or of some other design such as indicated at 13A in Figure 4 to serve as a cookie cutter if so desired. The base is secured at its upper end, by soldering or the like, to the interior of a ring or collar 14 whose outside diameter is equal to the inside diameter of the receptacle whereby the base may be firmly attached by a friction fit to the interior of the lower end of the receptacle and below the strainer 2, whose ring 3 serves as a limit stop for the insertion of the collar.

A variety of smaller sizes of cookie cutters 13B could be obtained by providing a smaller attaching ring or collar as indicated at 15 in Figure 5 whose inside diameter is equal to the outside diameter of the doughnut cutter 5 for firm attachment thereto by friction fit.

While I have shown a particular form of embodiment of my invention, I am aware that many minor changes therein will readily suggest themselves to others skilled in the art without departing from the spirit and scope of the invention. Having thus described my invention, what I claim as new and desire to protect by Letters Patent is:

A device of the class described comprising in combination a hollow cylindrical receptacle open at its top end, a ring secured to the interior of the receptacle near its lower end, a horizontal wire mesh screen secured to said ring to serve as a sifter or strainer and to support other substances within the receptacle, the wall of the receptacle having an opening formed therein above the plane of said screen, a closure plate slidably mounted within the receptacle and adapted to open and close said opening, a horizontally disposed tube secured to the exterior of said receptacle and surrounding said opening, the outer end of the tube being cut on a bias to its axis, whereby sausage filling ingredients resting upon said screen within the receptacle may be forced through the said opening and tube and into a sausage skin applied to and movable outwardly from said tube, a detachable hollow circular supporting base frictionally engaged at its upper end with the interior of the bottom end of the receptacle for elevating the same with respect to a support, the upper end of said base being secured to the interior of a collar whose outside diameter is equal to the inside diameter of said receptacle to provide said frictional engagement, and said screen-supporting ring providing a limit stop for the extent of the insertion of the collar within the receptacle.

References Cited in the file of this patent

UNITED STATES PATENTS

| | | |
|---|---|---|
| 313,320 | Goodale | Mar. 3, 1885 |
| 1,351,377 | Fitzberger | Aug. 31, 1920 |